(12) United States Patent
Lai et al.

(10) Patent No.: US 6,779,895 B1
(45) Date of Patent: Aug. 24, 2004

(54) COOLING SYSTEM FOR ELECTRONIC APPARATUS

(75) Inventors: Chih-Min Lai, Kaohsiung (TW); Ren-Cheng Chao, Taipei (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/403,426

(22) Filed: Mar. 31, 2003

(30) Foreign Application Priority Data

Apr. 4, 2002 (TW) ........................................ 91106816 A

(51) Int. Cl.[7] ............................................. G03B 21/18
(52) U.S. Cl. ........................................................ 353/61
(58) Field of Search ................................ 353/52, 57, 58, 353/60, 61

(56) References Cited

U.S. PATENT DOCUMENTS

| | | | | |
|---|---|---|---|---|
| 2,281,988 A | * | 5/1942 | Osterberg et al. | 353/61 |
| 4,669,865 A | * | 6/1987 | Bessho et al. | 353/61 |
| 6,398,366 B1 | * | 6/2002 | Hara et al. | 353/57 |
| 6,679,607 B2 | * | 1/2004 | Gulliksen | 353/61 |

* cited by examiner

Primary Examiner—Christopher E Mahoney
(74) Attorney, Agent, or Firm—Snell & Wilmer L.L.P.

(57) ABSTRACT

A cooling system for an electronic apparatus is provided. The electronic apparatus includes a housing and a fan. The housing has an outlet, a stopper fixed on the housing, and an opening next to the stopper. The fan generates a first air flow flowing to the outlet. The stopper retards a portion of the first air flow flowing to the outlet. A second air flow flows into the housing through the opening and mixes with the first air flow to cool the temperature of the first air flow.

9 Claims, 6 Drawing Sheets

ID: 6,779,895 B1

COOLING SYSTEM FOR ELECTRONIC APPARATUS

CROSS REFERENCE TO RELATED APPLICATIONS

This Application claims priority to Taiwan Patent Application No. 091106816 entitled "Cooling System For Electronic Apparatus", filed Apr. 4, 2002.

FIELD OF THE INVENTION

The present invention relates to a cooling system for use at an outlet of an electronic apparatus.

BACKGROUND OF THE INVENTION

The known projection display devices, such as a LCD projector, a projecting television, or a projector, display an image on a screen via an optical system with a light source, such as a lamp and the like. The light source in the projector is a high brightness lamp for projecting the image onto the screen.

The temperature of an interior of the projector, such as an LCD projector using a high brightness lamp, rises due to operation of lamp. The high temperature may damage the liquid crystal panels, and more seriously, crack the liquid crystal panels. Thus, the projector apparatus needs a cooling device to cool the operation temperature for assuring the normal operation of the liquid crystal panels. The cooling device, such as a fan, is generally utilized in the cooling system.

The conventional projection display device uses a fan to remove the heat generated by the components, e.g. lamp and the liquid crystal panels, and improve the efficiency of the projection apparatus.

In addition, if air flow outlet happens to be against a wall, the hot air is difficult to remove from the outlet. This will increase the temperature inside the apparatus, and the projection apparatus becomes unstable. Eventually, this affects the life of the projection apparatus. In addition, the hot air flow from the outlet will make the users uncomfortable when their hands or bodies are close to the outlet.

SUMMARY OF THE INVENTION

One aspect of the present invention is to lower the temperature of air flow at the outlet of an electronic apparatus, e.g. the outlet of a projector.

The present invention provides a cooling system for an electronic apparatus, and the electronic apparatus includes a housing having an outlet. The cooling system includes a device for generating a first air flow flowing from an interior of the housing to the outlet. The cooling system further includes a stopper, affixed on an inner wall of the housing, for hindering a portion of the first air flow from flowing to the outlet. Moreover, the cooling system farther includes an opening next to the stopper for allowing a second air flow to flow into the housing. The second air flow flows into the electronic apparatus and mixes with the first air flow.

BRIEF DESCRIPTION OF THE DRAWINGS

The present invention, together with objects and advantages thereof, may best be understood by reference to the following detailed description together with the accompanying drawings in which.

DETAILED DESCRIPTION

The present invention provides a cooling system for lowering the temperature at the outlet of an electronic apparatus 100. The term "an electronic apparatus 100" as used herein includes a projector, a liquid crystal projector, or other apparatus generating thermal energy when used.

Figure 1A:
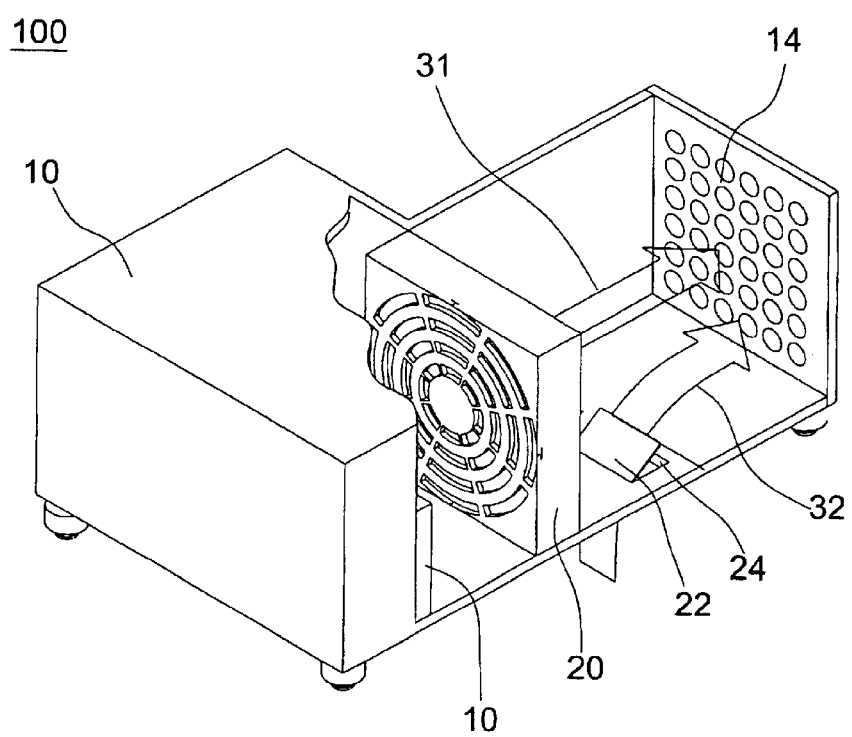
FIG. 1(a) is a top perspective view showing a first embodiment according to the present invention.
Figure 2:
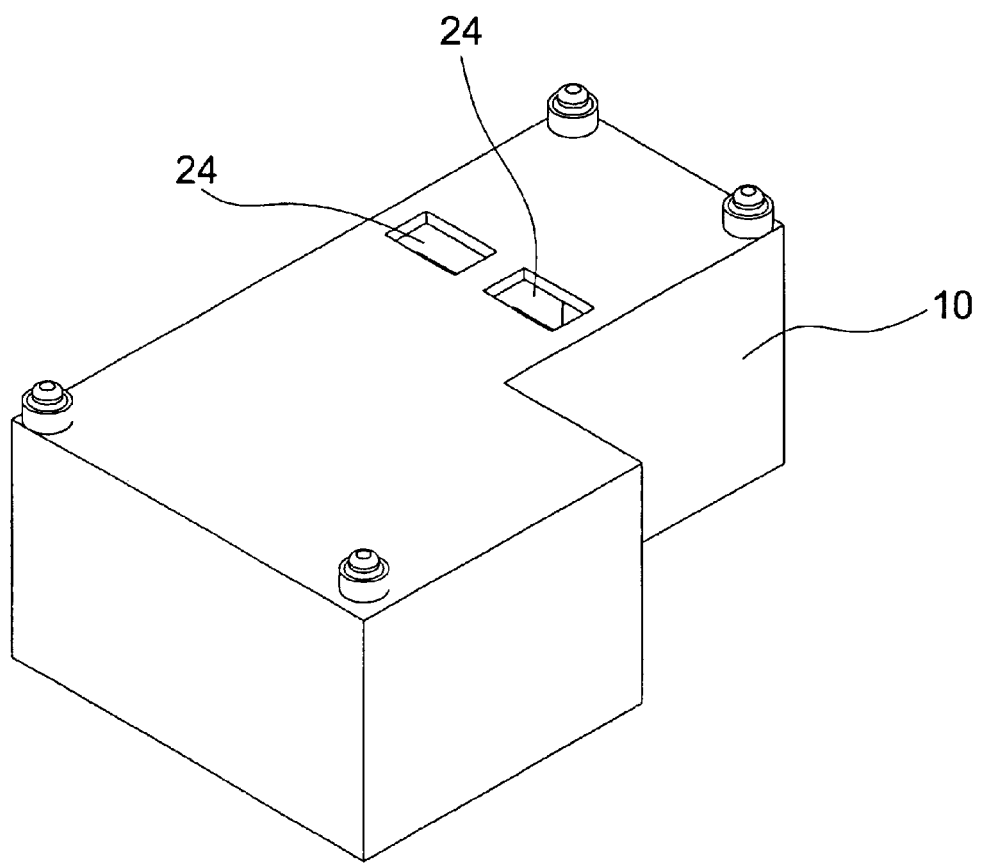
FIG. 2 is a bottom perspective view showing a first embodiment according to the present invention.

As shown in FIG. 1(a), an electronic apparatus 100 includes a housing 10 and an outlet 14. The bottom of the housing 10 includes a stopper 22 and an opening 24. The stopper 22 defines a down-stream side, and the opening 24 is located beside the stopper 22 or between the stopper 22 and the outlet 14. In FIG. 2, the arrangement of the opening 24 on the bottom of the housing 10 is clearly shown. Other than on the bottom of the housing 10, the stopper 22 also could be disposed on the side or on top of the housing 10.

Figure 1B:
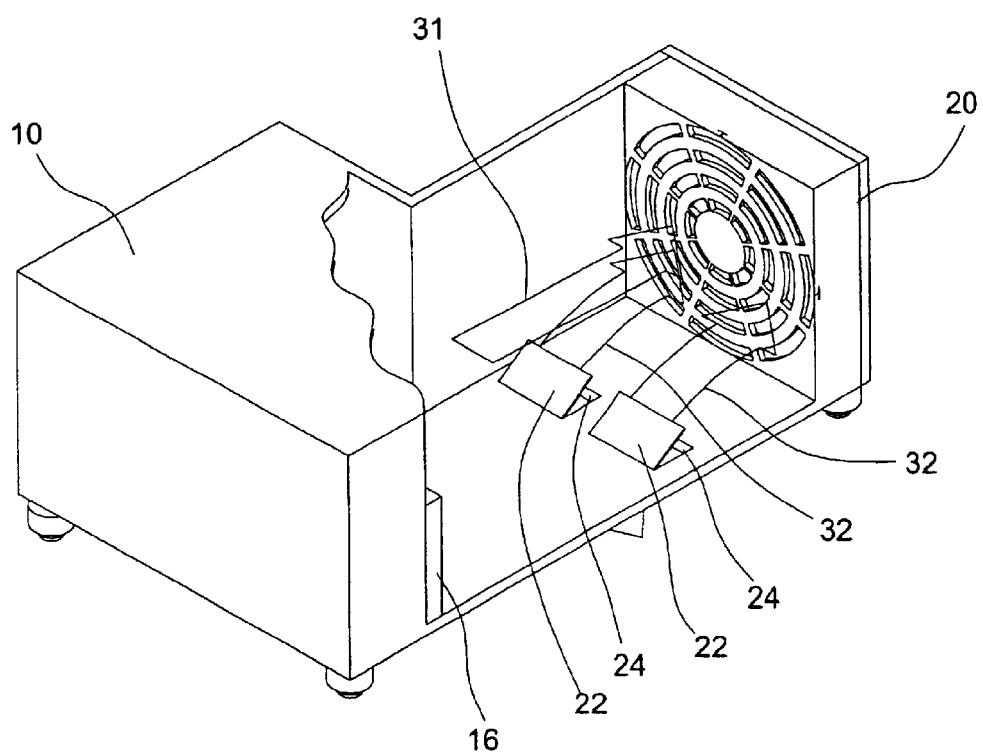
FIG. 1(b) is another top perspective view showing a first embodiment according to the present invention.

In electronic apparatus 100, a cooling device 20, for generating an air flow, and a heat source 16 are provided. The cooling device 20, such as a fan, is affixed on an interior portion of the electronic apparatus 100 as shown in FIG. 1(a), or is located near the outlet 14 as shown in FIG. 1(b). Between the heat source 16, such as a light source and the outlet 14, air flow channel is formed.

Figure 1C:
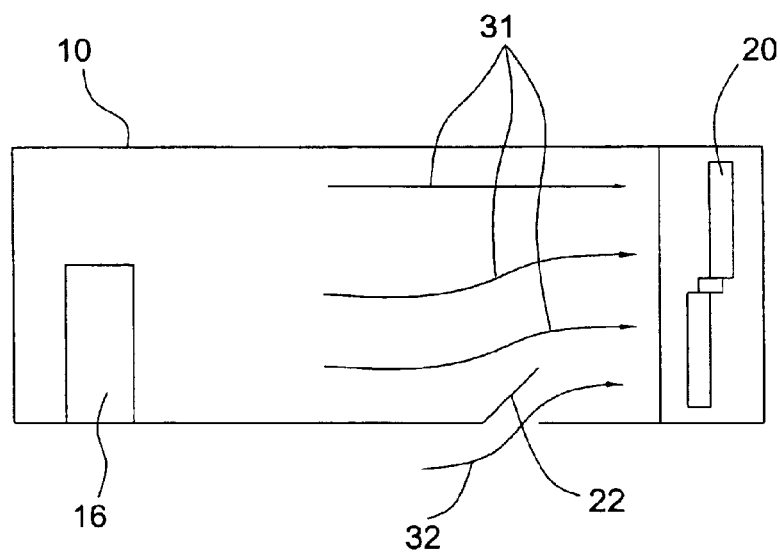
FIG. 1(c) is a side elevational view showing a first embodiment according to the present invention.

The cooling device 20 generates a first air flow 31 carrying heat to the outlet 14. The heat is generated by the heat source 16, such as a light source. However, the stopper 22 hinders a portion of the first air flow 31, such that the retarded portion of the first air flow 31 flows upwardly first before flowing to the outlet 14 as shown in FIG. 1(c).

The first air flow 31 flows quickly so as to have a low pressure. Therefore, the pressure under the lee side of the stopper 22 is much lower.

The pressure of exterior of the housing 10 is greater than the pressure at the lee side of the stopper 22. The pressure difference results in a second air flow 32. The second air flow 32 flows into the electronic apparatus 100 through the opening 24 as shown in FIG. 1(a), FIG. 1(b), and FIG. 1(c).

The first air flow 31 originates from interior of the electronic apparatus 100 and carries the heat generated by the electronic apparatus 100 away. The second air flow 32 flows from exterior to interior of the electronic apparatus 100. Thus, compared to the first air flow 31, the second air flow 32 has a lower temperature. The second air flow 32 mixes with the first air flow 3 1, so that the temperature of the resultant mixed air flow is lowered. As a result, the mixed air flow flows out of the electronic apparatus 100 through the outlet 14, and lowers the temperature at the outlet 14.

Figure 3A:
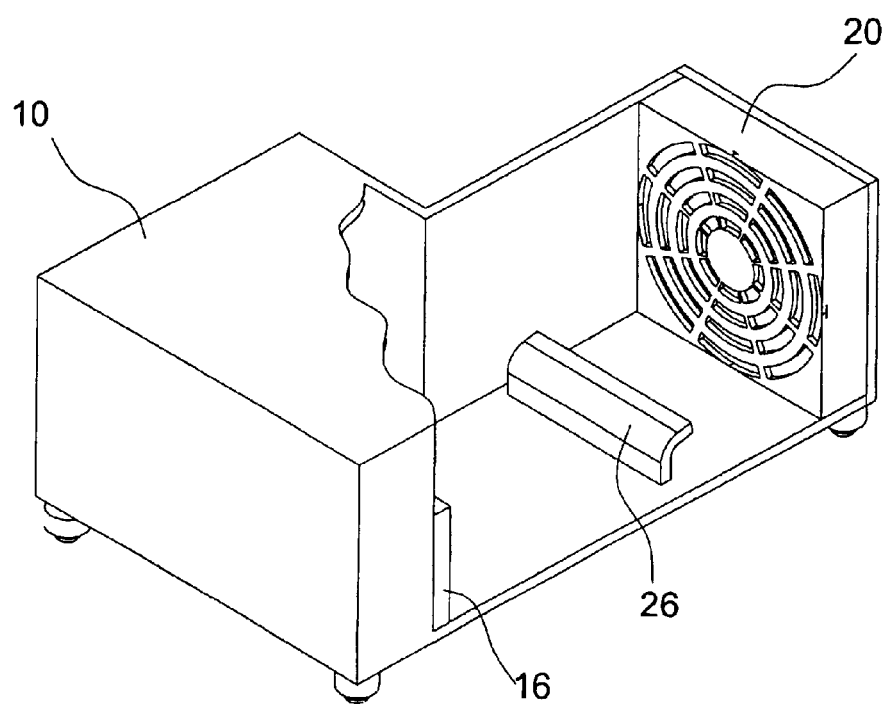
FIG. 3(a) is a top perspective view showing a second embodiment for the stopper.
Figure 3B:
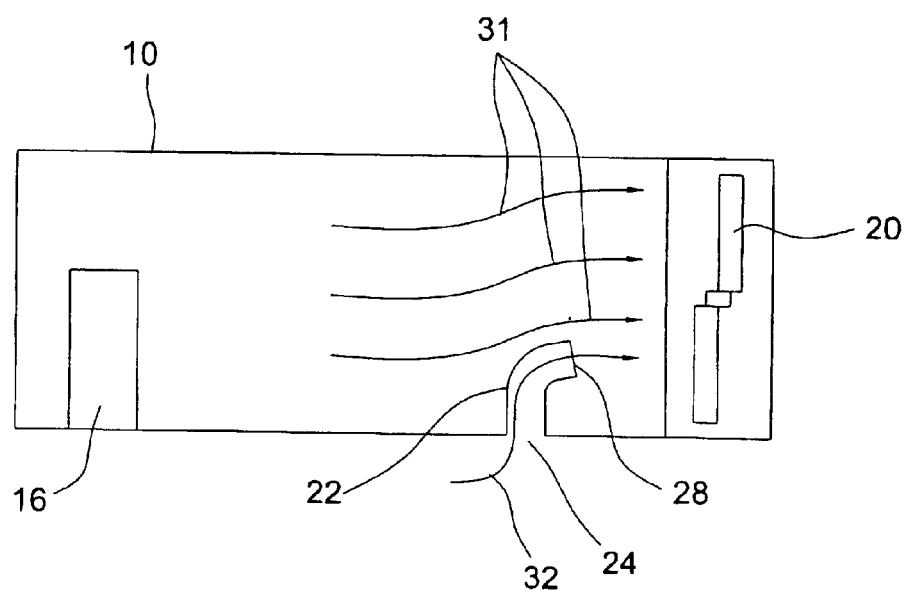
FIG. 3(b) is a side elevational view showing a second embodiment for the stopper.

Referring to FIG. 3(a), which is another embodiment of a stopper 26 for the stopper 22. The stopper 26 hinders the first air flow 31 and, meanwhile, the second air flow 32 is guided into the electronic apparatus through the opening 28 of the stopper 26, as shown in FIG. 3(a) and FIG. 3(b).

Although the invention has been shown and described with respect to the embodiments, it will be understood by those skilled in the art that various changes and modifications may be made without departing from the spirit and scope of the invention as defined in the following claims.

We claim:

1. A cooling system for an electronic apparatus, said electronic apparatus including a housing, said housing including an outlet, said cooling system comprising:

a device for generating a first air flow flowing from an interior of said housing to said outlet;

a stopper, affixed on an inner wall of said housing, for hindering a portion of said first air flow from flowing to said outlet; and an opening, formed in said housing and located between said stopper and said outlet, for allowing a second air flow to flow into said housing.

2. The cooling system of claim 1, wherein said second air flow flows into said electronic apparatus and mixes with said first air flow.

3. The cooling system of claim 1, wherein said device is a fan.

4. The cooling system of claim 1, wherein said electronic apparatus is a projector.

5. A cooling system for a projector, said projector including a housing and a cooling device, said cooling device generating a first air flow flowing from an interior of said housing to an outlet, said projector comprising:

a stopper, affixed on an inner wall of said housing, for hindering a portion of said first air flow from flowing to said outlet; and an opening, formed in said housing and located between said stopper and said outlet, for allowing a second air flow to flow into said housing.

6. The projector of claim 5, wherein said second air flow flows into said electronic apparatus and mixes with said first air flow.

7. The projector of claim 6, wherein said cooling device is a fan.

8. A projector, comprising:

a light source;

a housing including an outlet;

an air flow channel formed in an interior of said housing and located between said light source and said outlet;

a cooling device generating a first air flow, said first air flow flowing from said light source to said outlet through said air flow channel;

an opening, formed in said housing, for allowing a second air flow to flow into said air flow channel to lower the temperature of said first air flow; and a stopper disposed in said air flow channel and next to said opening to hinder a portion of said first air flow from flowing to said outlet.

9. The projector of claim 8, wherein said cooling device is a fan.

* * * * *